(12) United States Patent
Meingast et al.

(10) Patent No.: US 10,696,112 B2
(45) Date of Patent: Jun. 30, 2020

(54) LIGHTWEIGHT HITCH STRUCTURE

(71) Applicant: TOYOTA MOTOR ENGINEERING & MANUFACTURING NORTH AMERICA, INC., Erlanger, KY (US)

(72) Inventors: Herb Meingast, Ann Arbor, MI (US); Daniel Mount, Ann Arbor, MI (US); Kyle A. Banner, Ann Arbor, MI (US); David C. Smith, Plymouth, MI (US); Peter D. Susi, Ann Arbor, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 98 days.

(21) Appl. No.: 15/901,337

(22) Filed: Feb. 21, 2018

(65) Prior Publication Data
US 2019/0255898 A1 Aug. 22, 2019

(51) Int. Cl.
*B60D 1/07* (2006.01)
*B60D 1/48* (2006.01)
*B60D 1/167* (2006.01)
*B60D 1/50* (2006.01)

(52) U.S. Cl.
CPC ............ *B60D 1/485* (2013.01); *B60D 1/167* (2013.01); *B60D 1/50* (2013.01)

(58) Field of Classification Search
CPC . B60D 1/48; B60D 1/485; B60D 1/50; B60D 1/075; B60D 1/07; B60D 1/167
USPC ........................ 280/495; D12/162
See application file for complete search history.

(56) References Cited

U.S. PATENT DOCUMENTS

| | | | |
|---|---|---|---|
| 3,463,514 A * | 8/1969 | Warner | B60D 1/06 280/495 |
| 3,578,358 A * | 5/1971 | Reynolds | B60D 1/01 280/500 |
| 4,352,505 A | 10/1982 | Chambers | |
| 5,727,805 A | 3/1998 | La Roque | |
| 6,428,031 B1 * | 8/2002 | McCoy | B60D 1/075 224/519 |
| 7,607,677 B1 | 10/2009 | Bosak | |
| 7,823,903 B2 | 11/2010 | Swaggert | |
| 7,909,349 B2 | 3/2011 | Rasset et al. | |

(Continued)

FOREIGN PATENT DOCUMENTS

| | | | | |
|---|---|---|---|---|
| DE | 102013021380 | * | 7/2014 | ............... B60D 1/01 |
| EP | 1466787 | * | 10/2004 | ............... B60R 9/06 |

*Primary Examiner* — Anne Marie M Boehler
(74) *Attorney, Agent, or Firm* — Oblon, McClelland, Maier & Neustadt, L.L.P.

(57) ABSTRACT

A towing hitch receiver structure for a vehicle is disclosed. The towing hitch receiver structure includes a torsion tube; and a receiver structure mounted to the torsion tube at a center position between both ends. The receiver structure supports a receiver tube positioned below the torsion tube. The receiver structure includes a pair of side receiver plates, each plate having an opening that encircles the outer cross-section of the torsion tube and is secured to the torsion tube by a weld. The side plates are parallel to each other and to the receiver tube in the lengthwise direction. Because the receiver plates make up each side of the receiver structure, the torsion tube is allowed to bend freely. Provided the arrangement of side receiver plates, the hitch structure can be made using thinner, lighter weight parts.

11 Claims, 9 Drawing Sheets

(56) References Cited

U.S. PATENT DOCUMENTS

| | | | |
|---|---|---|---|
| 8,562,013 B1* | 10/2013 | Wentz, Jr. | B60D 1/07 |
| | | | 280/495 |
| 9,868,327 B1* | 1/2018 | Borkholder | B60D 1/485 |
| 2003/0049114 A1 | 3/2003 | Gerdelmann, III | |
| 2004/0021295 A1* | 2/2004 | Westerdale | B60D 1/485 |
| | | | 280/495 |
| 2011/0109063 A1 | 5/2011 | Fudala et al. | |
| 2013/0277945 A1* | 10/2013 | McCoy | B60D 1/485 |
| | | | 280/495 |
| 2016/0107493 A1* | 4/2016 | Krieger | B60D 1/485 |
| | | | 280/495 |
| 2016/0311281 A1* | 10/2016 | Mantovani | B60D 1/52 |
| 2019/0016183 A1* | 1/2019 | Scruggs | B60D 1/485 |
| 2019/0126700 A1* | 5/2019 | Belinky | B60D 1/52 |

* cited by examiner

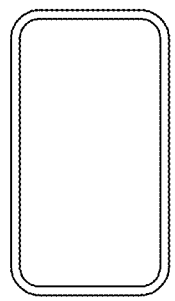
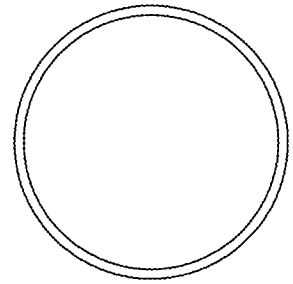
FIG. 3
FIG. 4
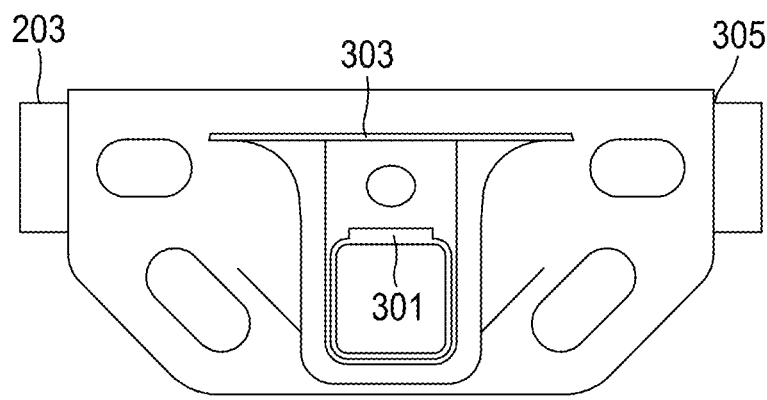
FIG. 5

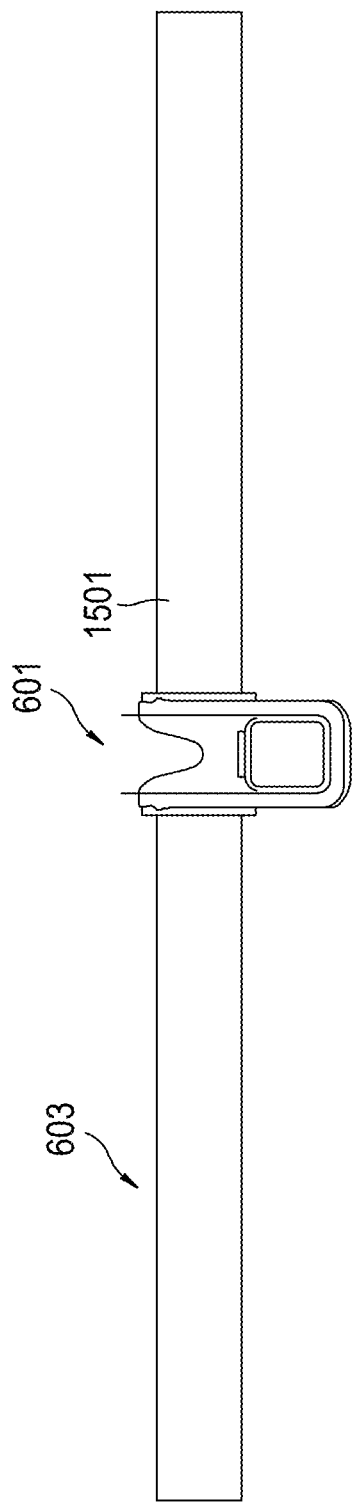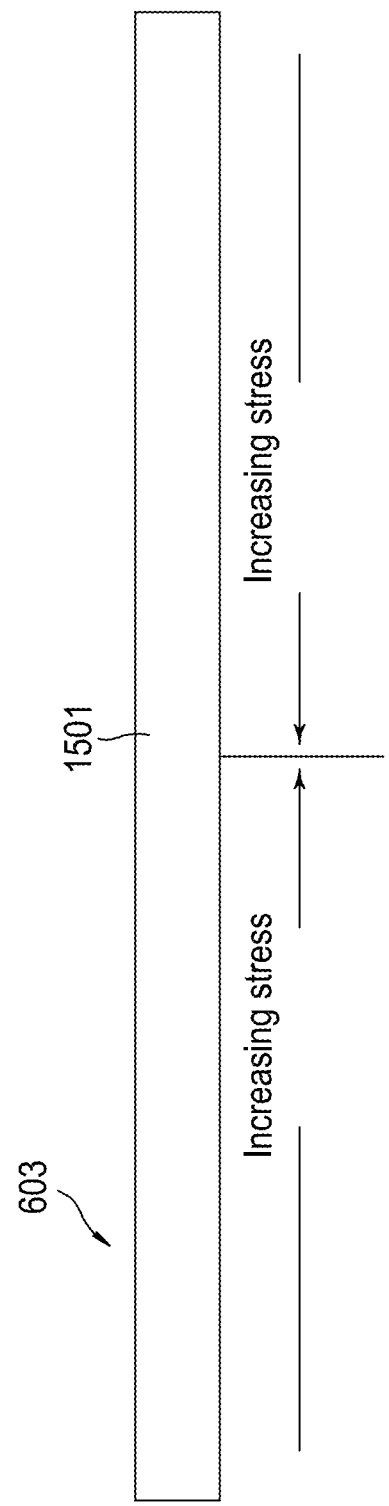

LIGHTWEIGHT HITCH STRUCTURE

FIELD OF DISCLOSURE

The present disclosure relates generally to a lightweight hitch structure, and that may be used, for example, in a pick-up truck or equivalent vehicle that has a towing capacity.

BACKGROUND

A tow hitch structure generally includes a tube section, having torsion tube and a center-mounted receiver tube, and a frame mounting structure that attaches the tube section to the frame of a vehicle. The receiver tube accepts a tow hitch. Under loading conditions, the tow hitch structure may show signs of cracking after a number of usage cycles, then after a further number of usage cycles, the tow hitch structure may fracture. Cracking and fracture occur due to stress concentrated at particular areas. In a conventional tow hitch structure, loading conditions on the receiver tube may lead to a bending stress on the torsion tube. The loading condition on the receiver tube that causes bending stress on the torsion tube leads to stress concentrated at areas of the structure for attaching the receiver tube to the torsion tube.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 3 is a cross-section of a rectangular torsion tube;

FIG. 4 is a cross-section of a cylindrical torsion tube;

FIG. 5 is a schematic that shows a receiver tube and chain plate for the hitch receiving section of FIG. 2;

FIG. 15 is a schematic that shows the stress distribution in the torsion tube with the welded reinforcement for the hitch structure of FIG. 6;

FIG. 16 is a schematic that shows the stress distribution in the torsion tube for the hitch structure of FIG. 6;

DETAILED DESCRIPTION

Figure 1:
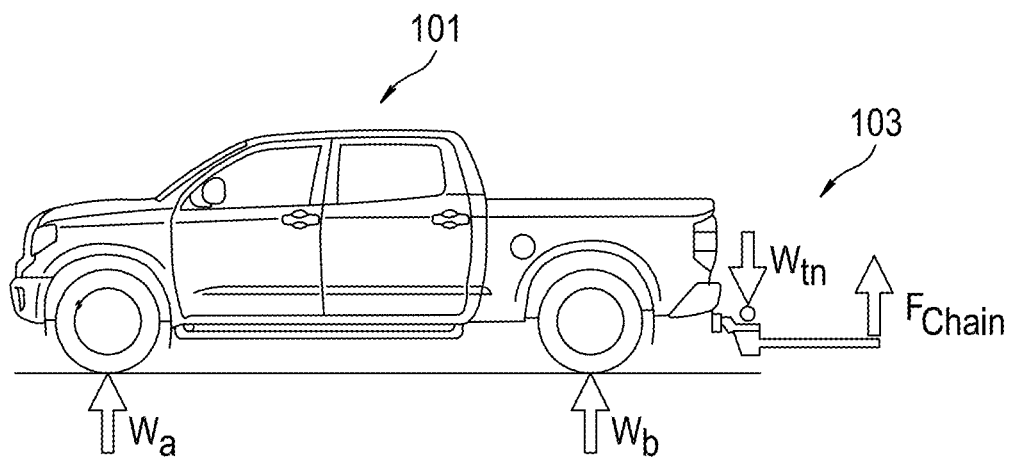
FIG. 1 is a schematic of a truck having a hitch structure.

Referring now to the drawings, wherein like reference numerals designate identical or corresponding parts throughout several views, the following description relates to tow hitch structure that achieves reduced stress on the receiver allowing for thinner parts.

Figure 2:
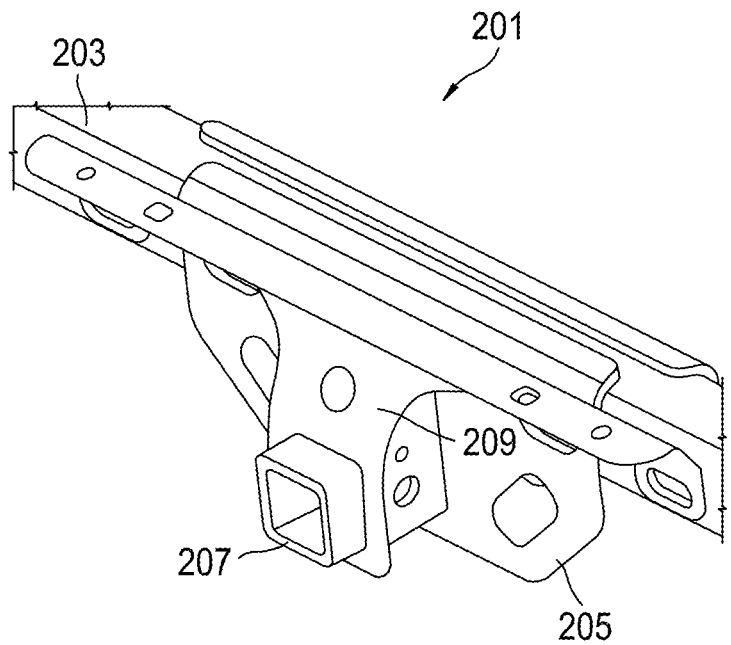
FIG. 2 is a schematic that shows a hitch receiving section.

FIG. 1 is a schematic of a truck having a hitch structure. The schematic shows a weight distribution under load. The load Wtn incurred at the hitch leads to a weight distribution Wa and Wb for the vehicle 101 and a torsion force Fchain on the hitch assembly 103. FIG. 2 is a schematic that shows a hitch receiving section. A hitch receiving section 201 may include a torsion tube 203, a cover plate 209, a chain plate 205 and a receiver tube 207. The receiver tube 207 receives a tow bar that is held in place by a close fit inside the receiver tube 207 and a cotter pin or bolt. A trailer under tow is hooked to a chain plate 205 by a chain that extends from the trailer to a hook. The torsion tube 203 may have any cross-section shape. Possible cross-section shapes include a rectangular cross-section, as in FIG. 3, a circular cross-section, as in FIG. 4, an elliptical cross-section, or a square cross-section. In the case of a polygon cross-section, the corners may be slightly rounded or squared. FIG. 5 is a schematic that shows a receiver tube and chain plate for the hitch receiving section of FIG. 2.

Under load conditions, the hitch receiving section undergoes high bending stress concentrated at the top of the receiver tube weld 301 due to input force from the receiver. Thus, the thickness of cover plate 209 must be substantial. High bending stress is concentrated at the top 303 of the cover plate 209 to the chain plate 205 due to substantial thickness of cover plate 209. High stress is concentrated on the torsion tube 203 at the outboard weld 305 between the torsion tube 203 and the chain plate 205 due to load transfer from the tube 203 to the chain plate 205. Thus, bending stress due to the cover plate leads to stress concentrated in particular areas in the vicinity of the attachment structure between the torsion tube 203 and the receiver tube 207 that can lead to cracking and fracture.

Figure 6:
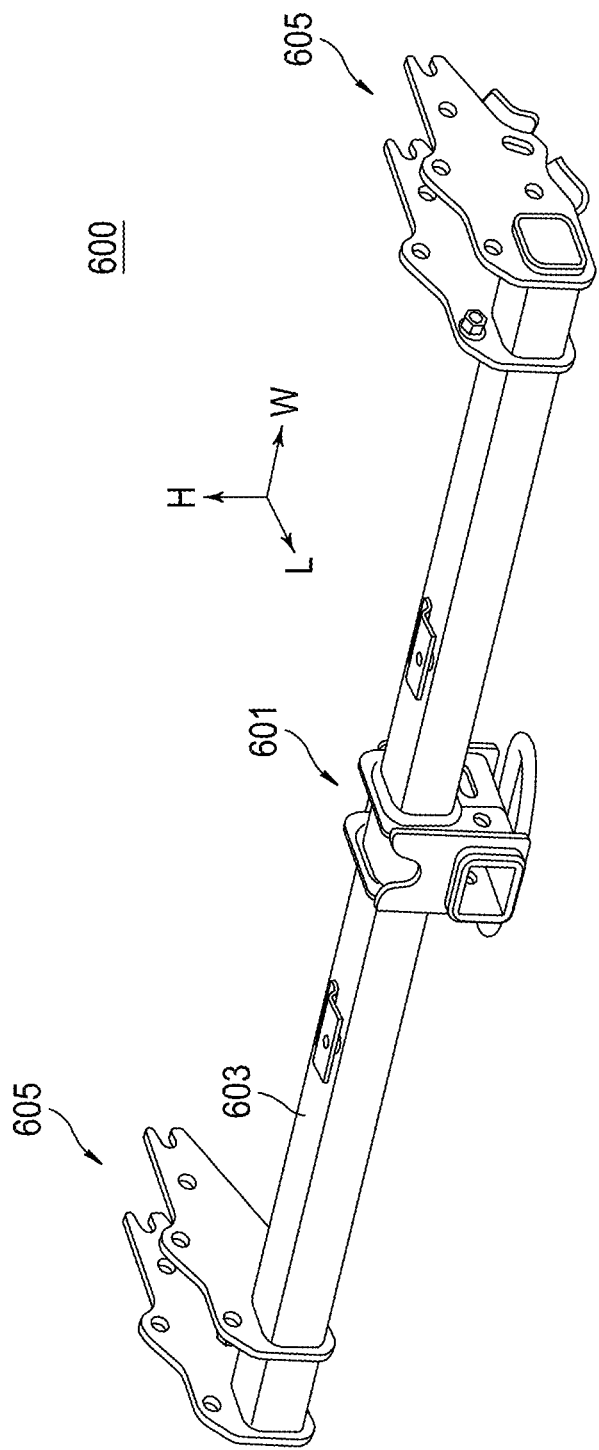
FIG. 6 is a schematic that shows a hitch structure according to an exemplary aspect of the disclosure.

FIG. 6 is a schematic that shows a hitch structure according to an exemplary aspect of the disclosure. The hitch receiver structure 600 includes a U-shaped bracket 601. As can be seen in FIG. 6, the hitch structure includes a side bracket 605 at each end of the torsion tube 603 for mounting to the vehicle frame. The side brackets 605 produce a rigid end of the torsion tube and increase the strength of connection to the frame.

Although several types of materials may be used in the hitch structure, the hitch structure 600 is preferably of high strength steel. High strength steel is defined as steel with ultimate tensile strength greater than 270 megapascal. In some embodiments, the material may be a material that is resistant to rusting, such as a stainless steel. Other types of materials may include aluminum, magnesium or composite depending on the range of loads that the hitch structure is expected to handle.

Figure 7A:
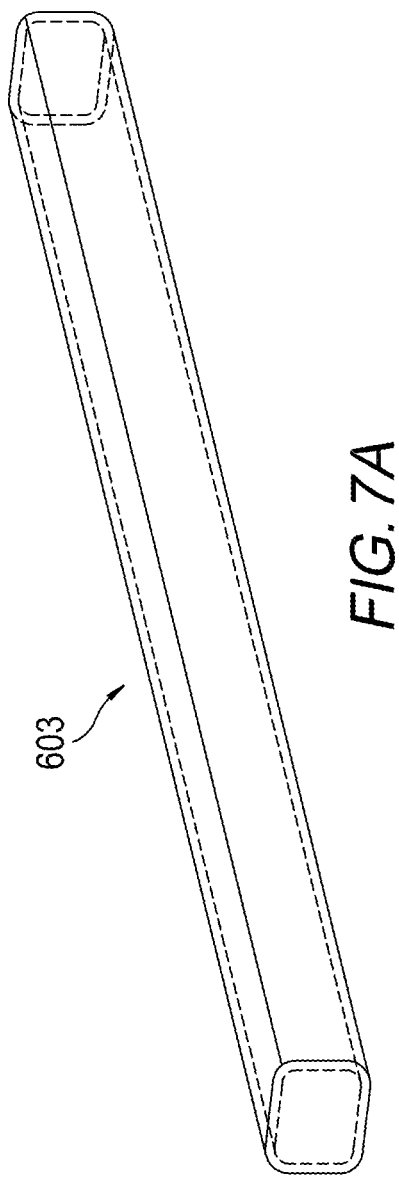
FIG. 7A is a schematic that shows a torsion tube for the hitch structure of FIG. 6.
Figure 7B:
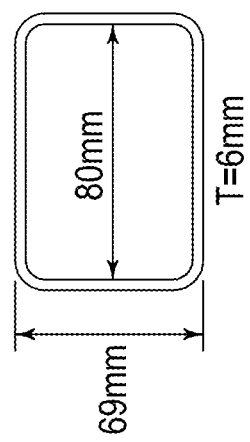
FIG. 7B is a cross-section of the torsion tube.

FIG. 7A is a schematic that shows a torsion tube for the hitch structure of FIG. 6. FIG. 7B is a schematic that shows a cross-section of the torsion tube. In an exemplary aspect, the torsion tube 603 is a metal tube (for example high strength steel) with a wall that is in a range of about 2 mm to about 7.14 mm thick. In an exemplary aspect, the tube has a rectangular cross-section in which the width is about 80 mm inside the walls. The height may be about 69 mm. One may vary the height, width, and thickness of the torsion tube to achieve desired capacity. The present disclosure enables reduced component thickness. Other hitch structures are known to have a much higher component thickness.

Figure 8:
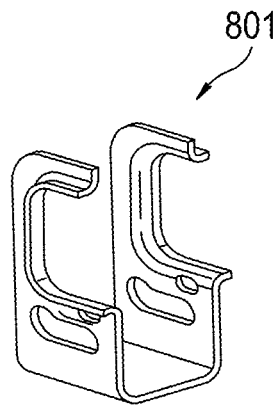
FIG. 8 is a schematic that shows a reinforcement part of a receiver hitch for the hitch structure of FIG. 6.
Figure 9:
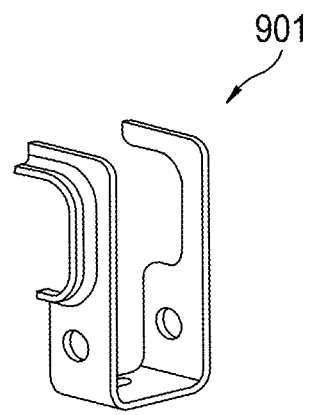
FIG. 9 is a schematic that shows an opposing reinforcement part of a receiver hitch for the hitch structure of FIG. 6.
Figure 10:
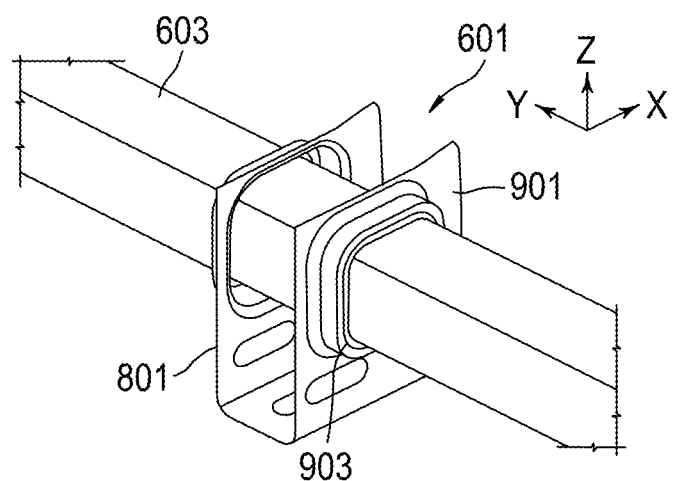
FIG. 10 is a schematic that shows the welded reinforcement for the hitch structure of FIG. 6.

FIG. 8 is a schematic that shows a reinforcement portion of the U-shaped bracket of a receiver hitch for the hitch structure of FIG. 6. FIG. 9 is a schematic that shows an opposing reinforcement portion of the U-shaped bracket of a receiver hitch for the hitch structure of FIG. 6. FIG. 10 is a schematic that shows the welded reinforcement for the hitch structure of FIG. 6. The U-shape of bracket 601 is formed as two parallel receiver plates connected by a lower plate. The parallel receiver plates may be rectangular and each include openings that encircle the torsion tube 603 in a radial direction. When mounted, each receiver plate is substantially perpendicular to the axis of the torsion tube 603. The parallel receiver plates may be other shapes, as long as they can accommodate an opening for the torsion tube 603 and a lower plate connecting the receiver plates. The distance between inner surfaces of the parallel receiver plates is sized to accept the receiver tube 207 between the plates. Because a receiver plate is not mounted to the torsional tube in an axial direction, the receiver plate is not subject bending stress due to bending of the torsion tube 603 along its axis when the receiver tube is under load.

In one embodiment, as shown in FIGS. 8 and 9, the U-shaped bracket 601 may be assembled from two portions, a front U-shaped portion 801 and a rear U-shaped portion 901 for ease of assembly to the torsion tube 603. The two portions 801 and 901 may be welded to the torsion tube 603 to encircle the torsion tube 603 at two parallel openings. Each receiver plate and lower plate of the U-shaped bracket 601 is a thin plate. In an exemplary aspect, instead of two portions 801, 901, the parallel receiver plates and lower plate may be a single fabricated piece. In such case, the torsion tube 603 may be slid through the openings from one end to place the U-shaped bracket 601 at a position at the center of the torsion tube 603. The opening that the torsion tube fits in may be attached by a continuous weld (i.e., do not have a weld end). In some embodiments, the openings of the U-shaped bracket 601 may be welded to the torsion tube by a discontinuous weld with weld ends that end at an area of least stress.

Because the thin receiver plates encircle the torsion tube 603 and are substantially perpendicular to the torsion tube 603, the thin receiver plates can deform with the slight bending of the torsion tube 603. Also the thin receiver plates that make up each side of the U-shaped bracket 601 allow the torsion tube 603 to bend freely. Thus, most of the bending stress due to load on the receiver tube 207 occurs in the torsion tube 603 and stress concentration is spread out evenly along the torsion tube 603.

Figure 11:
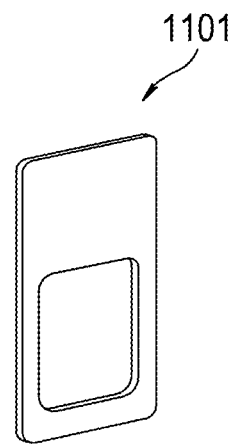
FIG. 11 is a schematic that shows a reinforcement plate for the hitch structure of FIG. 6.
Figure 12:
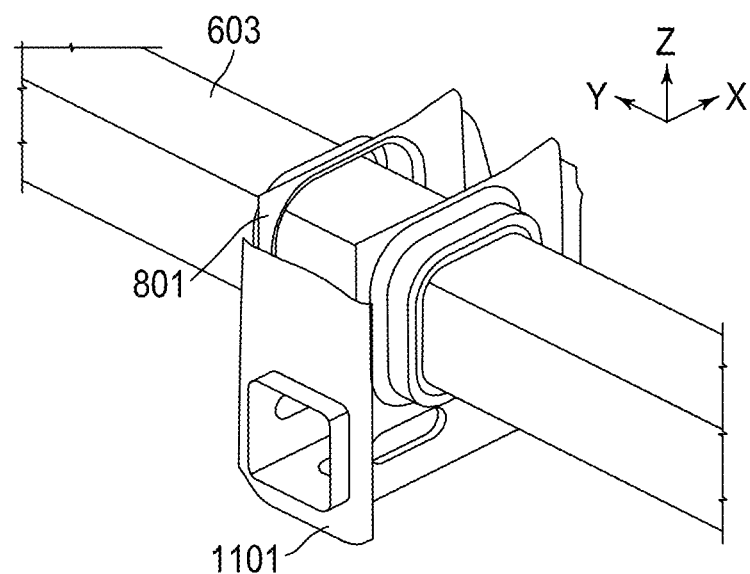
FIG. 12 is a schematic that shows the attached position of the reinforcement plate of FIG. 11.

FIG. 11 is a schematic that shows a cover plate for the hitch structure of FIG. 6. FIG. 12 is a schematic that shows the attached position of the cover plate of FIG. 11. As shown in FIG. 11, the cover plate 1101 is flat with an opening that matches the shape and dimensions of the receiver tube 207. The cover plate 1101 is mounted to ends of the U-shaped bracket 801 in a manner that allows it to bend with the slight deformation of the U-shaped bracket 601, rather than incurring stress concentration as the torsion tube 603 bends.

Figure 13:
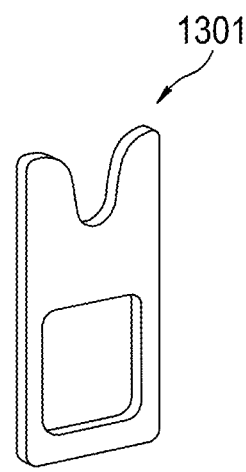
FIG. 13 is a schematic that shows a reinforcement plate for the hitch structure of FIG. 6.
Figure 14:
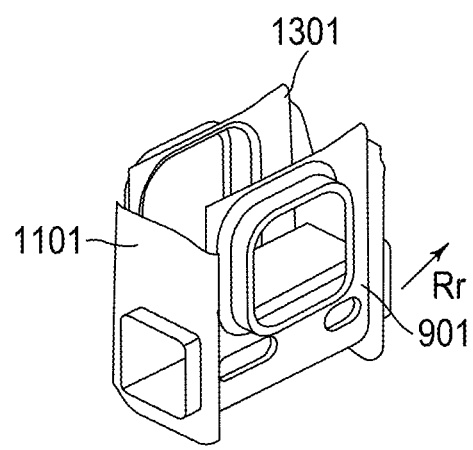
FIG. 14 is a schematic that shows the attached position of the reinforcement plate of FIG. 13.

FIG. 13 is a schematic that shows a rear reinforcement plate for the hitch structure of FIG. 6. FIG. 14 is a schematic that shows the attached position of the reinforcement plate of FIG. 13. As shown in FIG. 13, the rear reinforcement plate 1301 is also flat and serves to support the other end of the receiver tube 207. As shown in FIG. 14, the cover plate 1101 and rear reinforcement plate 1301 serve to support the receiver tube 207.

In some embodiments, the U-shaped bracket 601 may be formed without the lower plate. Instead, the parallel receiver plates of the bracket 601 may be sufficiently welded to the torsion tube 603 to handle rated loading conditions for the hitch structure.

FIG. 15 is a schematic that shows the stress distribution in the torsion tube with the welded reinforcement for the hitch structure of FIG. 6. Because the torsion tube 603 is allowed to bend with the U-shaped bracket 601, the stress is evenly distributed 1501. FIG. 16 is a schematic that shows the stress distribution in the torsion tube for the hitch structure of FIG. 6. As shown in FIG. 16, the stress 1501 gradually increases towards the center of the torsion tube 603.

Each end of the torsion tube 603 is attached to the frame of a vehicle by respective side brackets 605. In an exemplary aspect, each side bracket 605 includes a pair of reinforcement plates that are attached to each side of the frame wall. The pair of reinforcement plates will provide a greater stiffness.

Figure 17:
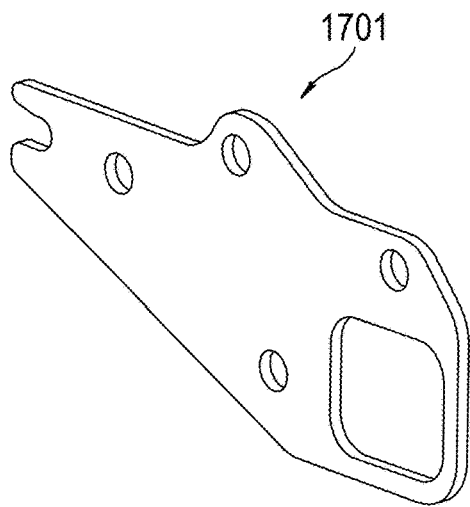
FIG. 17 is a schematic that shows a frame inner reinforcement plate for the hitch structure of FIG. 6.
Figure 18:
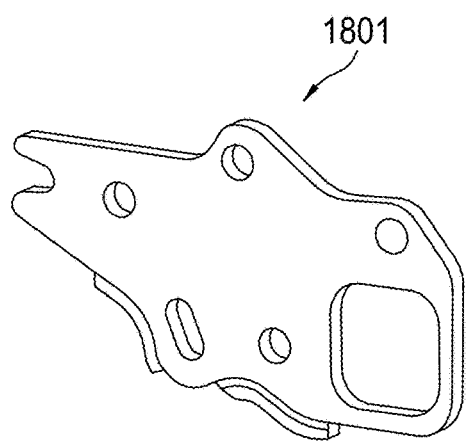
FIG. 18 is a schematic that shows a frame outer reinforcement plate for the hitch structure of FIG. 6.
Figure 19:
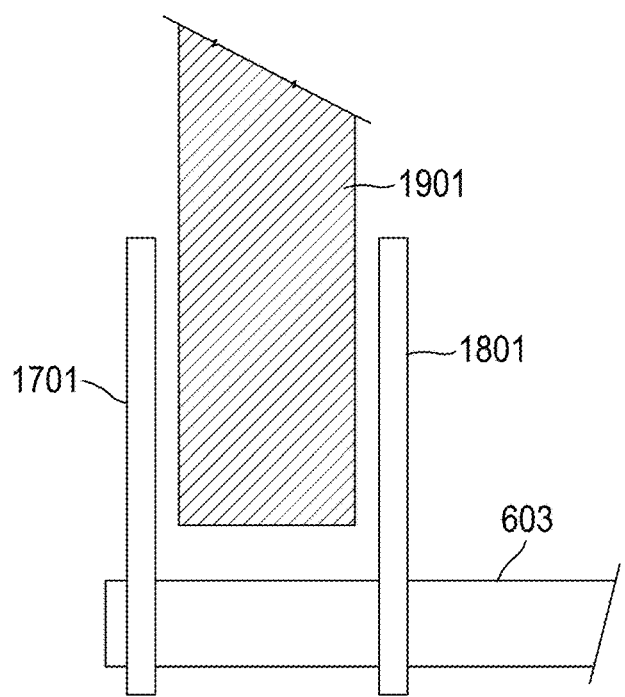
FIG. 19 is a schematic that shows mounted frame reinforcement plates of FIGS. 17 and 18 according to an exemplary aspect of the disclosure.

FIG. 17 is a schematic that shows a frame inner reinforcement plate for the side bracket of the hitch structure of FIG. 6. FIG. 18 is a schematic that shows a frame outer reinforcement plate for the side bracket of the hitch structure of FIG. 6. FIG. 19 is a schematic that shows mounted frame reinforcement plates of FIGS. 17 and 18 according to an exemplary aspect of the disclosure. As shown in FIG. 19, each end of the torsion tube 603 is held by a pair of an inner reinforcement plate 1701 and an outer reinforcement plate 1801, mounted on either side of a frame wall 1901. Both the inner reinforcement plate 1701 and the outer reinforcement plate 1801 include an opening that matches the outer cross-section of the torsion tube 603 such that the reinforcement plates can be slid over the tube when being mounted. Each reinforcement plate 1701, 1801 may have at least three holes in identical positions. In an exemplary aspect, the reinforcement plates are bolted by a set of bolts that pass through holes in each opposing reinforcement plate 1701, 1801 and the vehicle frame 1901 from the same direction. In one embodiment, three bolts are used to secure the reinforcement plates. The bolts may be standard bolts sufficient to handle the load from the torsion tube. Example bolts are M14 bolts and accompanying nuts. The bolts are inserted to face the same direction, which ensures ease of assembly. The arrangement in which the bolts pass through holes in the reinforcement plates is such that the bolts are only loaded in shear. Thus, the bolts are not subject to bending stress, which ensures extended durability of the frame attachment.

Provided the distributed stress levels in the torsion tube, reinforcement plates can be made thinner and the overall weight of the hitch structure may be made lighter. Provided an attachment of the torsion tube to the vehicle frame using a pair of an inside reinforcement plate and an outside reinforcement plate, the tube is rigidly mounted with increased strength and reduced stress.

Numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A towing hitch receiver structure for a vehicle, the structure comprising:
   a torsion tube; and
   a receiver structure mounted to the torsion tube at a center position between both ends of the torsion tube, the receiver structure supports a receiver tube positioned below the torsion tube,
   wherein the receiver structure includes a pair of side plates, each side plate having an opening that encircles an outer cross-section of the torsion tube and is secured to the torsion tube by a continuous weld,
   wherein the side plates are parallel to each other and to the receiver tube in a lengthwise direction,
   wherein the receiver structure is U-shaped and includes a lower plate that connects each side plate, and
   wherein the U-shaped receiver structure has two U-shaped parts, each U-shaped part partially surrounding the outer cross-section of the torsion tube, which when combined form a complete pair of sides that surround the torsion tube.

2. The towing hitch receiver structure of claim 1, wherein the torsion tube has a rectangular cross-section,
   wherein the opening in the pair of side plates matches an outer peripheral of the rectangular cross-section.

3. The towing hitch receiver structure of claim 1, further comprising side brackets at each end of the torsion tube that mount the torsion tube to a vehicle frame, each side bracket includes a pair of reinforcement plates mounted on opposing sides of a wall of the vehicle frame.

4. The towing hitch receiver structure of claim 3, wherein the pair of reinforcement plates are mounted to the wall of the vehicle frame by three bolts, each bolt is tightened with a nut and passes through both reinforcement plates and the wall of the vehicle frame in a same direction.

5. The towing hitch receiver structure of claim 1, wherein the receiver structure includes a front cover plate attached to ends of the side plates and having an opening.

6. The towing hitch receiver structure of claim 5, wherein the receiver structure includes a rear cover plate attached to ends of the side plates and having an opening.

7. The towing hitch receiver structure of claim 6, wherein the receiver tube passes through the openings of each of the front cover plate and the rear cover plate.

8. The towing hitch receiver structure of claim 1, wherein the receiver structure, end brackets, and torsion tube are of high strength steel.

9. The towing hitch receiver structure of claim 1, wherein the torsion tube has a wall thickness of substantially 7.14 mm.

10. The towing hitch receiver structure of claim 1, wherein the torsion tube has a wall thickness of substantially 6 mm.

11. The towing hitch receiver structure of claim 1, wherein the torsion tube has a wall thickness in a range of 2 mm to 5 mm.

* * * * *